Nov. 24, 1936.  A. LAMESCH  2,062,228
METHOD AND DEVICE FOR PRODUCING SINGLE LAYERED WIRE GLASS
Filed July 5, 1934
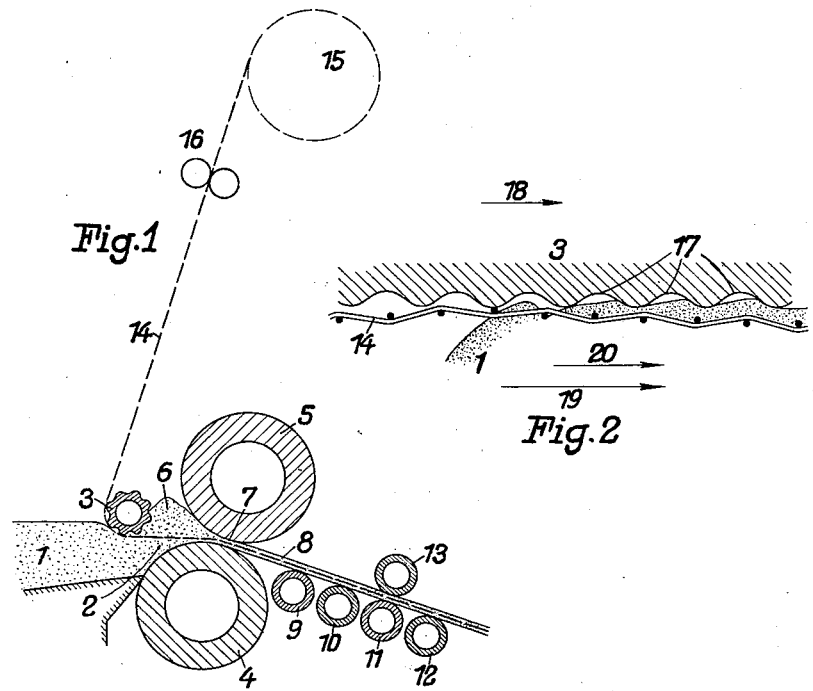
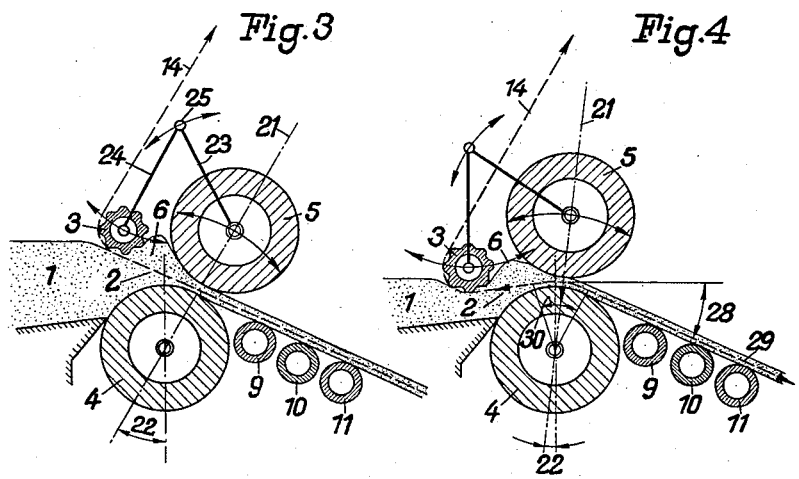
Inventor:
A. Lamesch
By: Marks & Clerk
Attys.

Patented Nov. 24, 1936

2,062,228

UNITED STATES PATENT OFFICE 2,062,228

METHOD AND DEVICE FOR PRODUCING SINGLE-LAYERED WIRE GLASS

Armand Lamesch, Waldenburg-Altwasser, Germany, assignor to Schlesische Spiegelglas-Manufactur Carl Tielsch, G. m. b. H., Waldenburg-Altwasser, Germany Application July 5, 1934, Serial No. 733,888
In Germany July 11, 1933

2 Claims. (Cl. 49—32)

This invention relates to a method and device for producing single-layered wire glass.

In applying the known methods it is a difficult task to prevent distortion of the wire insertion and to place it uniformly in the center of the sheet of glass, to prevent, further, oxidation of the wires and the production of cloudiness and discoloration by the dissolution of the metal of the wires in the glass, to avoid the formation of bubbles in the glass during the introduction of the wire insertion, and to obtain a smooth surface free from seams caused by the passage of the wire insertion.

During the application of these methods temperature, toughness and surface tension of the glass, the height of the glass mass and fluxes and refluxes within the latter play an important part. These are factors which are difficult to control or keep constant, which show the effect of changes very slowly and which often differ in the center and on the sides of the glass plate. The methods depending on these factors are therefore sensitive and unstable, require constant careful supervision and produce much waste, as defects will readily happen and can be eliminated only after a long time.

The method according to the invention eliminates these difficulties and drawbacks, reduces waste to a negligible amount and produces a better quality.

According to the invention, the wire insertion is placed in the fused glass mass around an adjustable roller serving as guide. This guide roller is disposed in front of the molding rollers, dips into the glass, possesses grooves which extend parallel to the generatrix of the roller surface or are helical or arrow-shaped and whose circumferential speed is lower than that of the molding rollers or has a direction opposite to the latter, and forms with the lower molding roller a passage or gap whose cross sectional area per unit of width is greater than that of the gap formed by the upper and lower molding rollers.

After leaving the passage the wire insertion moves under and past a roll of glass forming between the guide and top molding rollers, which continually renews itself and remains constant as to dimensions, and then passes into the molding gap which forms the glass sheet.

Since the wire insertion rests on the tops of the grooves of the guide roller and dips into the glass mass, the latter passes through the meshes of the insertion into the grooves. As the wire insertion passes at a speed, which is practically equal to the circumferential speed of the molding rollers, over the grooves of the guide roller rotating at a lower speed or in opposite direction, the glass passing or forced through the meshes and gaps of the wire insertion is, so to speak, ironed or spread over the wires, knots and crossing points, so that the wire insertion is not exposed to the air and thus cannot oxidize while at the same time inclusions of air are prevented. Owing to the fact that the passage formed by the guide roller and the lower molding roller has a larger cross sectional area per unit of width than the molding gap formed by the two molding rolers, it is evident that the passage will allow more glass to pass than the forming gap, so that between the guide roller and the top molding roller a roll of glass will be formed which will increase until the effect of the hydrostatic pressure of the glass mass in front of the passage, the conveying effect of the wire insertion and of the lower molding roller and, on the other hand, the effect of the hydrostatic pressure of the roll of glass as well as the pressure exerted upon the glass mass contained in the roll are balanced by the tension to which the upper skin of the roll of glass, which is variable as to longitudinal extension owing to changes in the position of the guide roller, is subjected by the differences between the circumferential speeds of the guide roller and of the top molding roller. As the conveying effect of the wire insertion and of the lower molding roller as well as the pressure of the glass skin are the main factors in this respect, this state of equilibrium will automatically be reestablished in case of fluctuations, i. e., the roll of glass, in a way, regulates itself as to thickness and practically remains constant.

The influences due to fluctuations in temperature and viscosity of the glass, the height of the glass mass, fluxes and refluxes therein and the formation of skin are thus practically eliminated. The surface of the glass produced has a beautiful smoothness, because impressions and creases that might possibly be produced by the grooves of the guide roller are smoothed out by the tension to which the top of the roll of glass is subjected by the difference in circumferential speed between the guide and top molding rollers.

The thickness of the roll of glass can be regulated by varying the passage, i. e., the position of the guide roller relative to the molding rollers and/or by varying the angle formed by the plane passing through the axes of the two molding rollers with the perpendicular and by changing the position of the three rollers relative to the surface of the glass.

By way of example, the invention is diagrammatically illustrated in the accompanying drawing, in which Figure 1 is a vertical section of a device for carrying out the method described; Fig. 2, a view of the development of a portion of the circumference of the guide roller when contacting with the wire insertion and the glass mass; and Figs. 3 and 4 show the adjustability of the various rollers and the variation of the arc of contact of the wire insertion with the various rollers.

Referring to the drawing, and first to Fig. 1, 1 is the fused glass which is passed to the rolling mill and thus enters the passage 2 formed by the guide roller 3 and the lower molding roller 4. Between the guide roller 3 and the top molding roller 5 a roll or wave 6 is formed in the fused glass, whereupon the mass of glass passes into the molding gap 7 formed by the lower molding roller 4 and the top molding roller 5. The mass comes out of the molding gap 7 in the form of a plate or sheet 8 which passes over the delivery rollers 9 and 10 and the transport rollers 11 and 12 and under the polishing roller 13 before entering the cooling channel. The wire insertion unwinds from a roll 15, passes through the guide 16 and then moves onto the guide roller 3 which brings it into the glass.

In the development shown in Fig. 2 the wire insertion 14, which may be a wire netting, rests on the tops of the grooves 17 of the guide roller 3, and the liquid glass, which is subjected to the hydrostatic pressure due to the depth of immersion of the roller 3, flows through the meshes of the insertion 14. The circumferential speed 18 of the guide roller 3 is much smaller than the speed 19 of the insertion 14, so that the relative speed 20 is the result. The relative motion of the guide roller 3 and the wire insertion 14 at the relative speed 20 causes the glass that has flown through the meshes to be spread over the wires, knots and points of intersection of the insertion 14. The speeds 18 and 19 and thus the relative speed 20 can be varied at will and adapted to the nature of the wire insertion. The grooves 17 of the guide roller 3 must also be adapted as to form and number to the kind of wire insertion used.

In Figs. 3 and 4 is 21 the sectional line of the plane of the drawing and the plane extending through the axes of the two molding rollers 4 and 5. Variation of the angle of inclination 22 formed by this plane and the perpendicular can, for example, be attained by causing the upper molding roller 5 to be swung on a cylinder having the axis of the lower roller 4 as axis towards both sides of the perpendicular and by driving the upper molding roller by the lower by means of toothed wheels.

A change in the position of the guide roller 3 may be effected by articulating it to both sides of the upper molding roller 5 by means of two levers 23 and 24 connected by a joint 25, the lever 23 being movable about the axis of the roller 5 and the lever 24 about the joint 25. In this way any desired position may be imparted to the guide roller 3, it being preferable in this case to take the drive from the upper molding roller 5 and to transmit it to the guide roller 3 by means of the joint 25 and chains and sprockets. The thickness of the roll of glass 6 can be regulated by varying the angle 22, the height of the passage 2, the adjustment of the guide roller 3 and the roller speeds.

By varying the position of the guide roller 3 and the upper molding roller 5 any desired angle of contact 30 may be imparted to the wire insertion 14 relative to the lower molding roller 4. For example, in Fig. 3 the angle of contact is zero, so that the wire insertion is not subjected to an action which could alter its height in the glass.

In Fig. 4, the angle of contact 30 has a certain size. As the wire insertion 14 is under tension, it has the tendency to adapt its position to the connecting tangent of the guide roller 3 and the delivery roller 9 and thus extends downwardly in the glass. By varying the angle of contact 29 the height of the wire insertion in the glass can be altered at will, and even an upward pull might be imparted to the insertion if necessary.

After leaving the molding rollers the sheet of glass can be passed through pattern rollers in known manner.

I claim:—

1. A method of producing single-layered wire glass from fused glass consisting in adjusting a grooved guide roller to the desired position, so as to dip into the fused glass, introducing a wire insertion round the guide roller into the fused glass at a point away from molding rollers prior to passing the wire insertion between the molding rollers, and rotating the grooved guide roller at a circumferential speed lower than that of the molding rollers.

2. A method of producing single-layered wire glass from fused glass consisting in adjusting a guide roller to the desired position with respect to a pair of molding rollers and immersing the lower surface of said guide roller into the fused glass producing a wave of fused glass of constant dimensions between the guide roller and the molding rollers by means of giving the space between the guide roller and the lower molding roller a larger cross sectional area per unit of width than the molding gap formed by the two molding rollers and utilizing the conveying effect of a wire insertion, and passing the wire insertion through said wave of glass prior to passing the wire insertion between the molding rollers.

ARMAND LAMESCH.